Feb. 14, 1933.    H. J. BAUR    1,897,601
ADMISSION TOKEN DEPOSITARY AND ACCOUNTING DEVICE
Filed Oct. 9, 1930    8 Sheets-Sheet 1
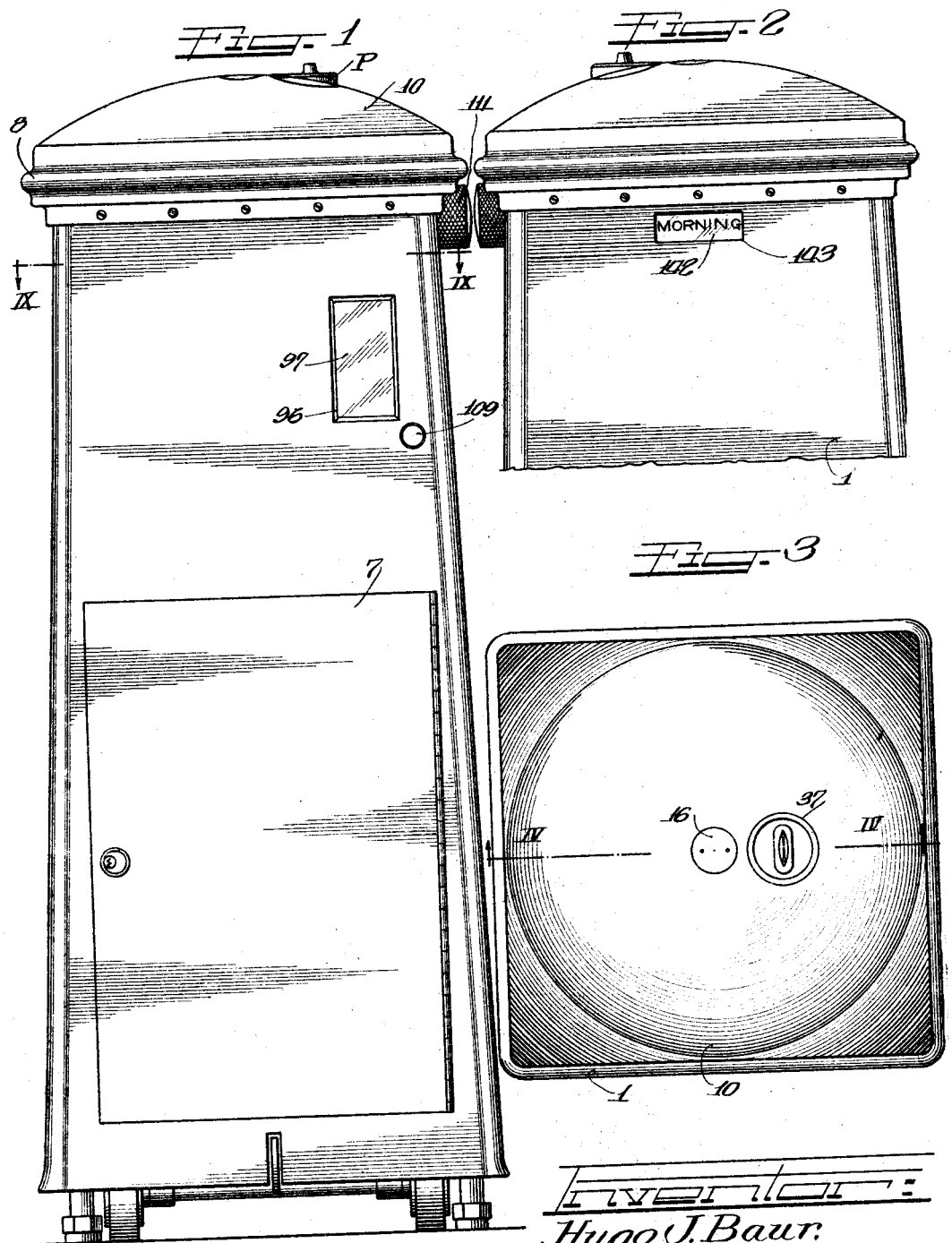

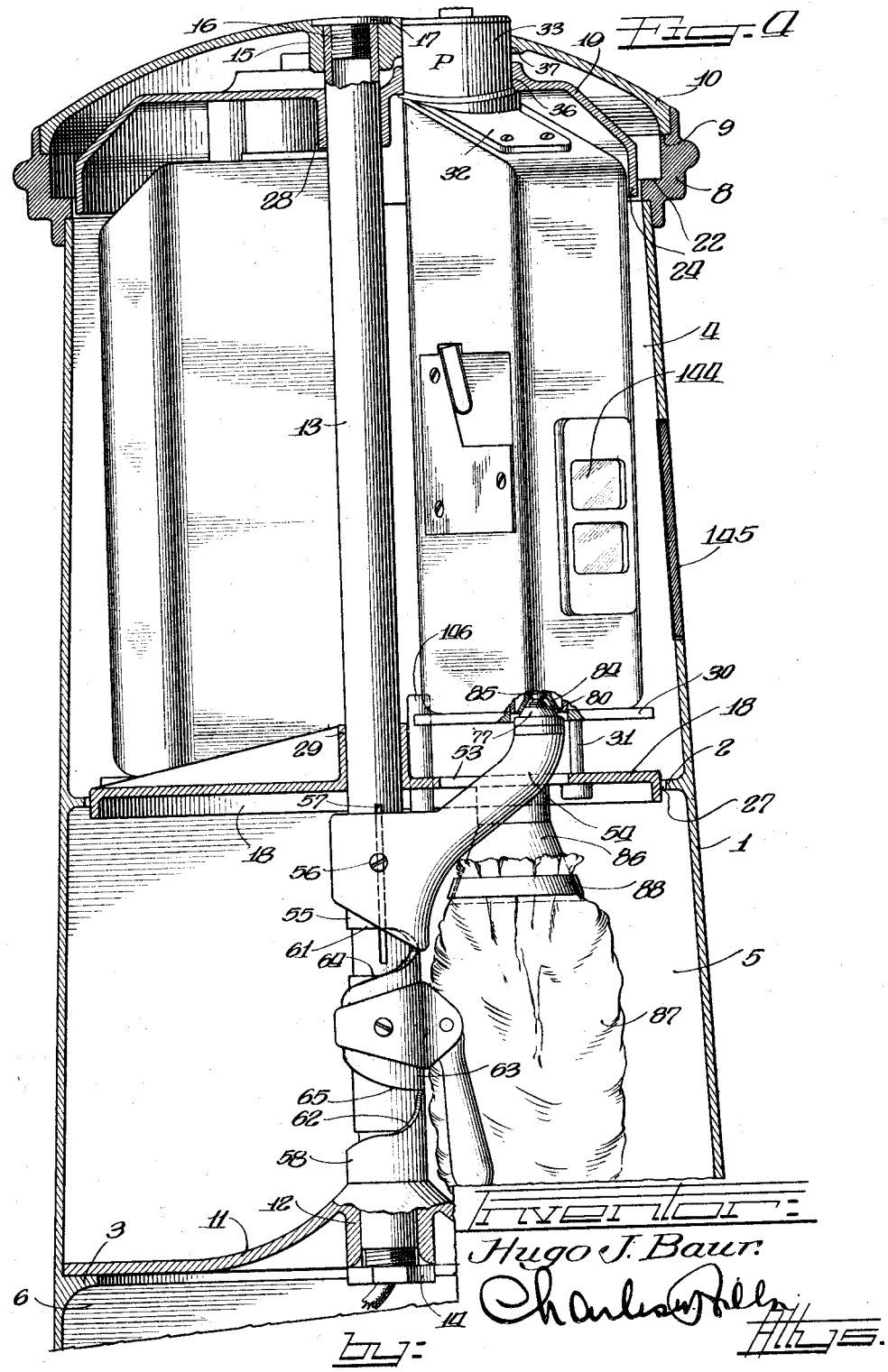

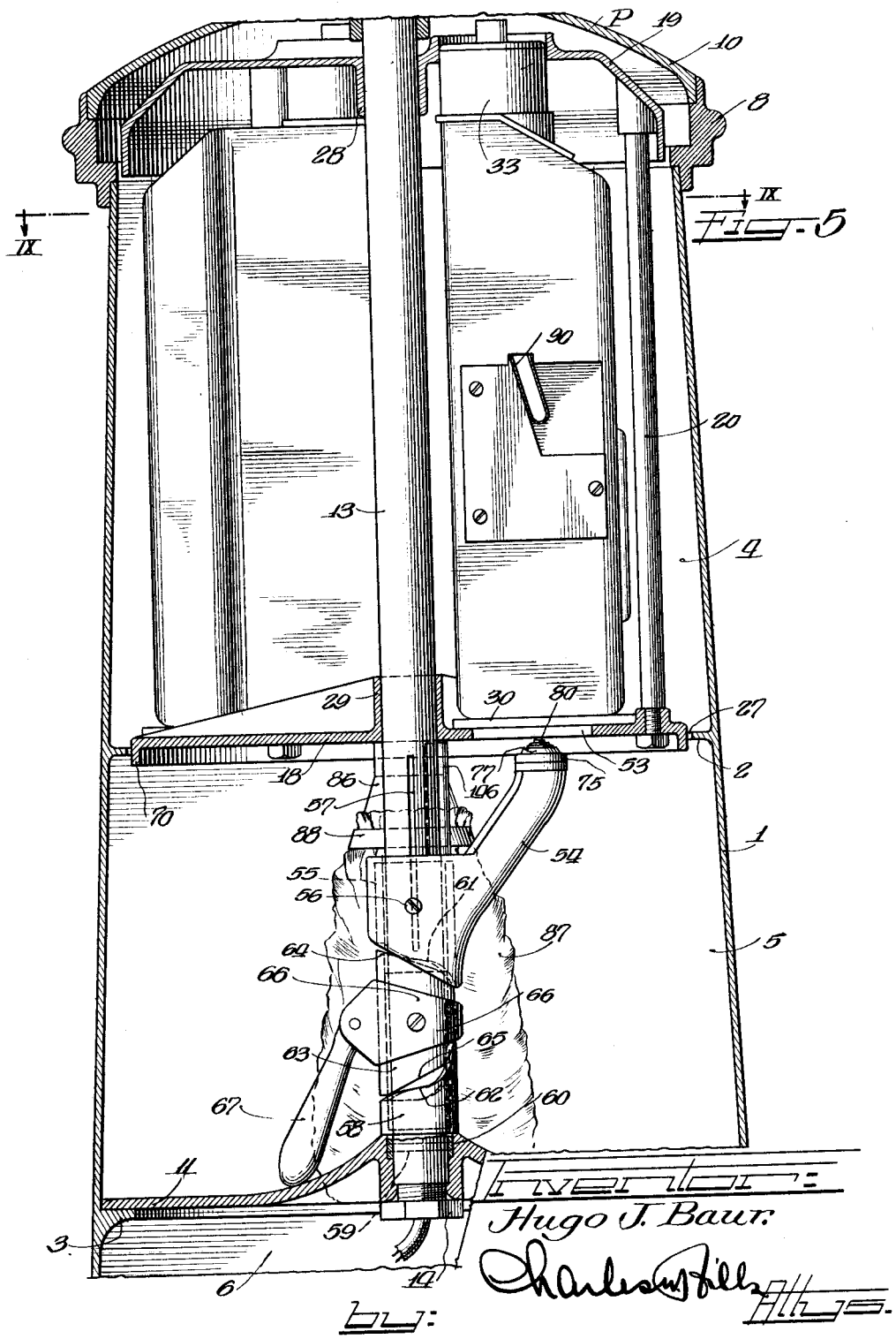

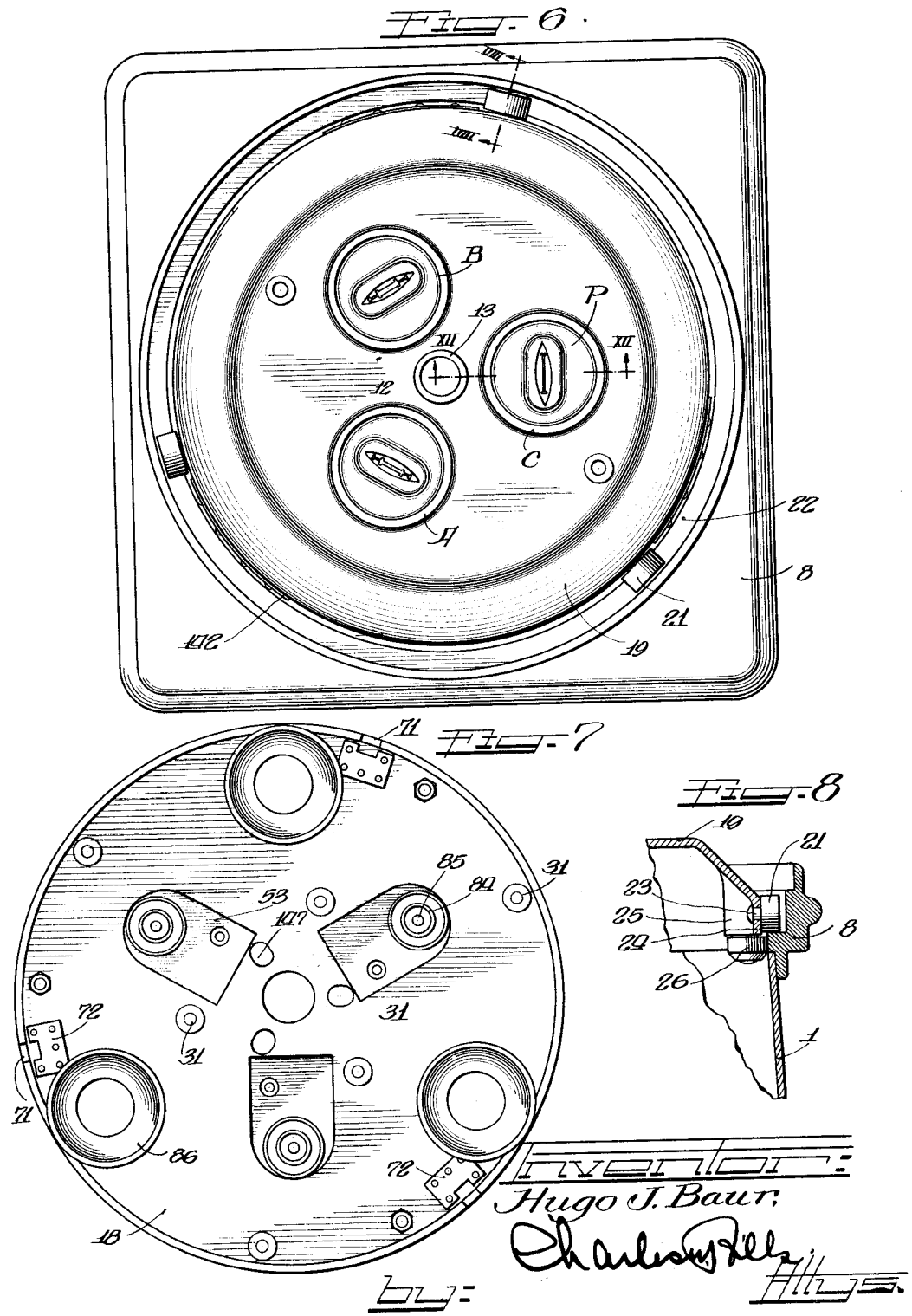

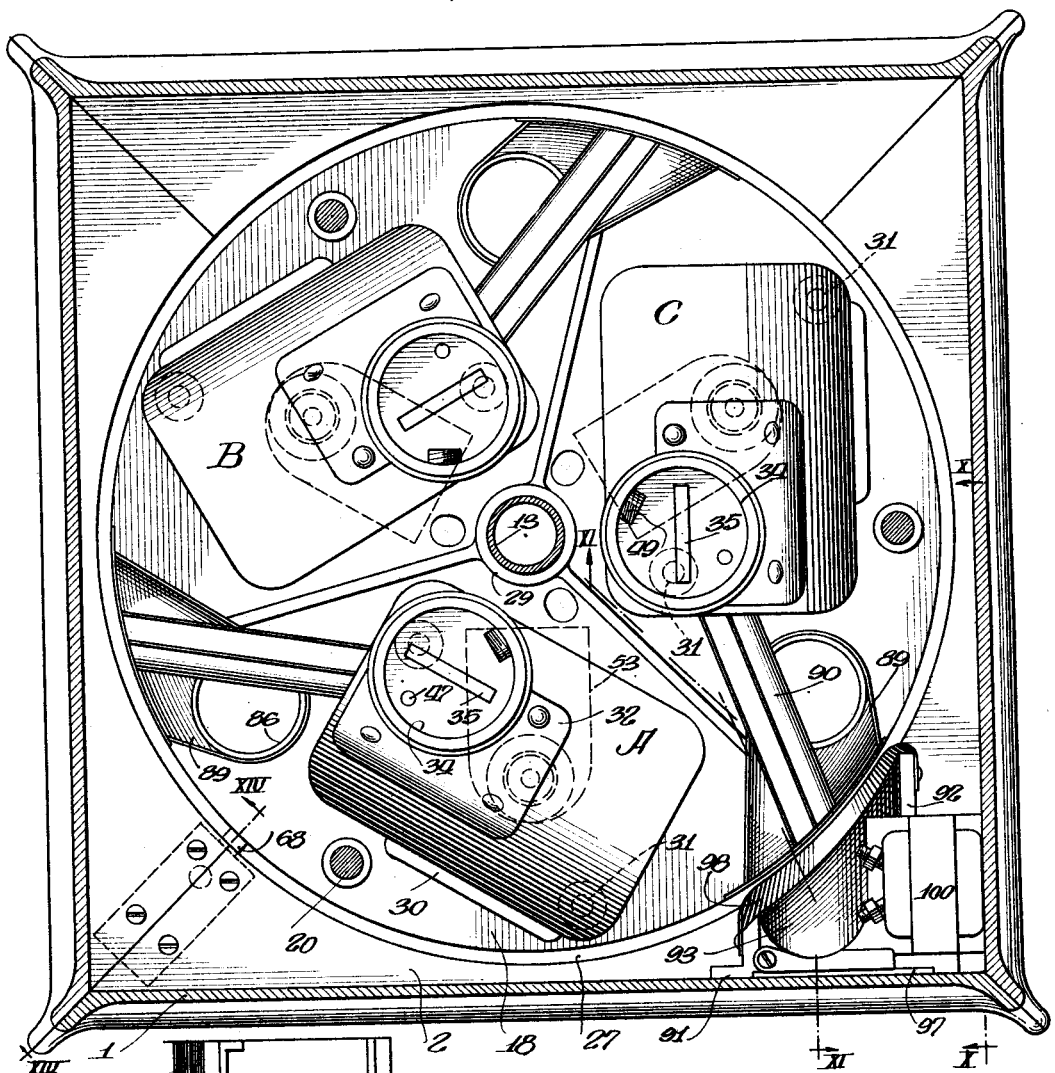

Feb. 14, 1933.  H. J. BAUR  1,897,601
ADMISSION TOKEN DEPOSITARY AND ACCOUNTING DEVICE
Filed Oct. 9, 1930  8 Sheets-Sheet 6
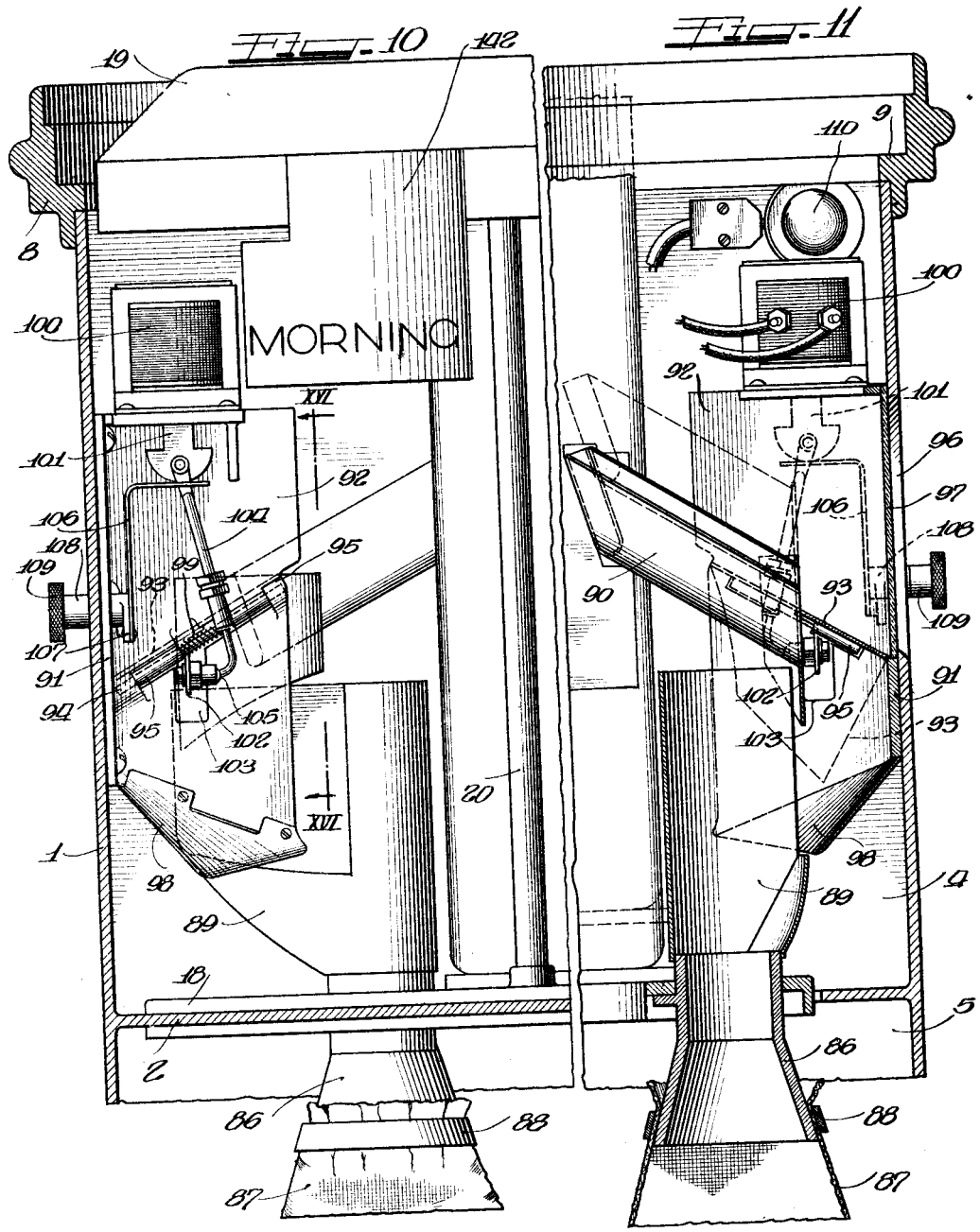
Inventor:
Hugo J. Baur.
by

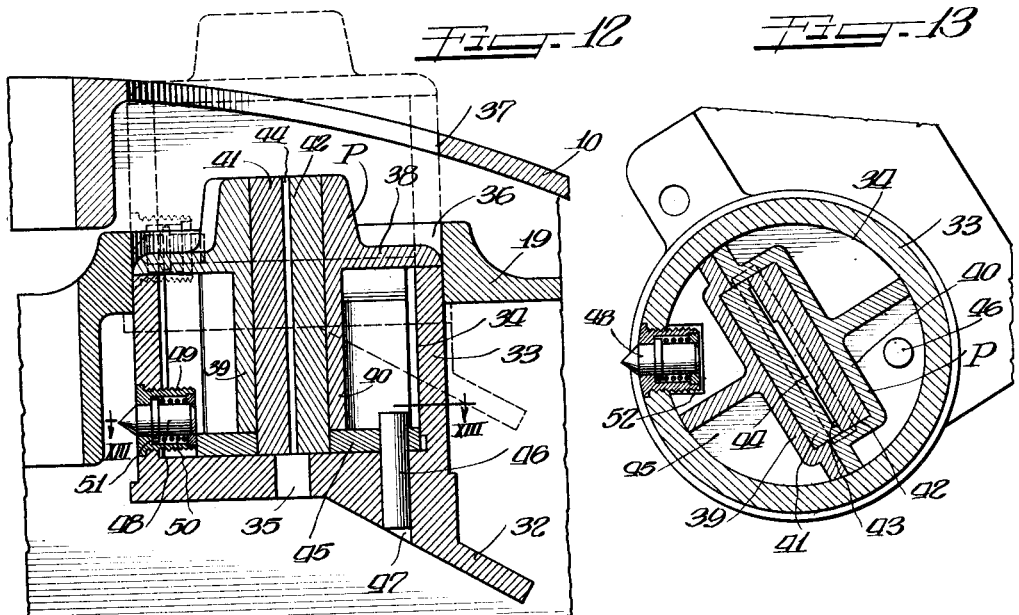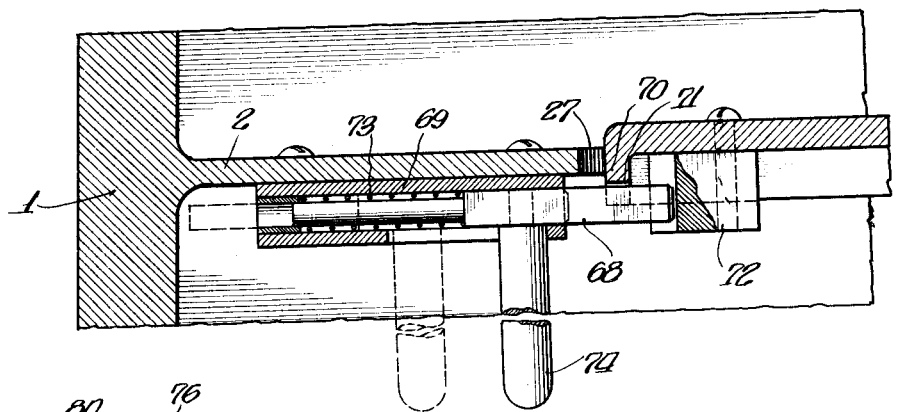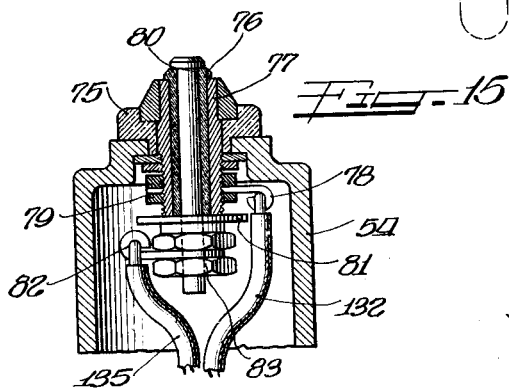

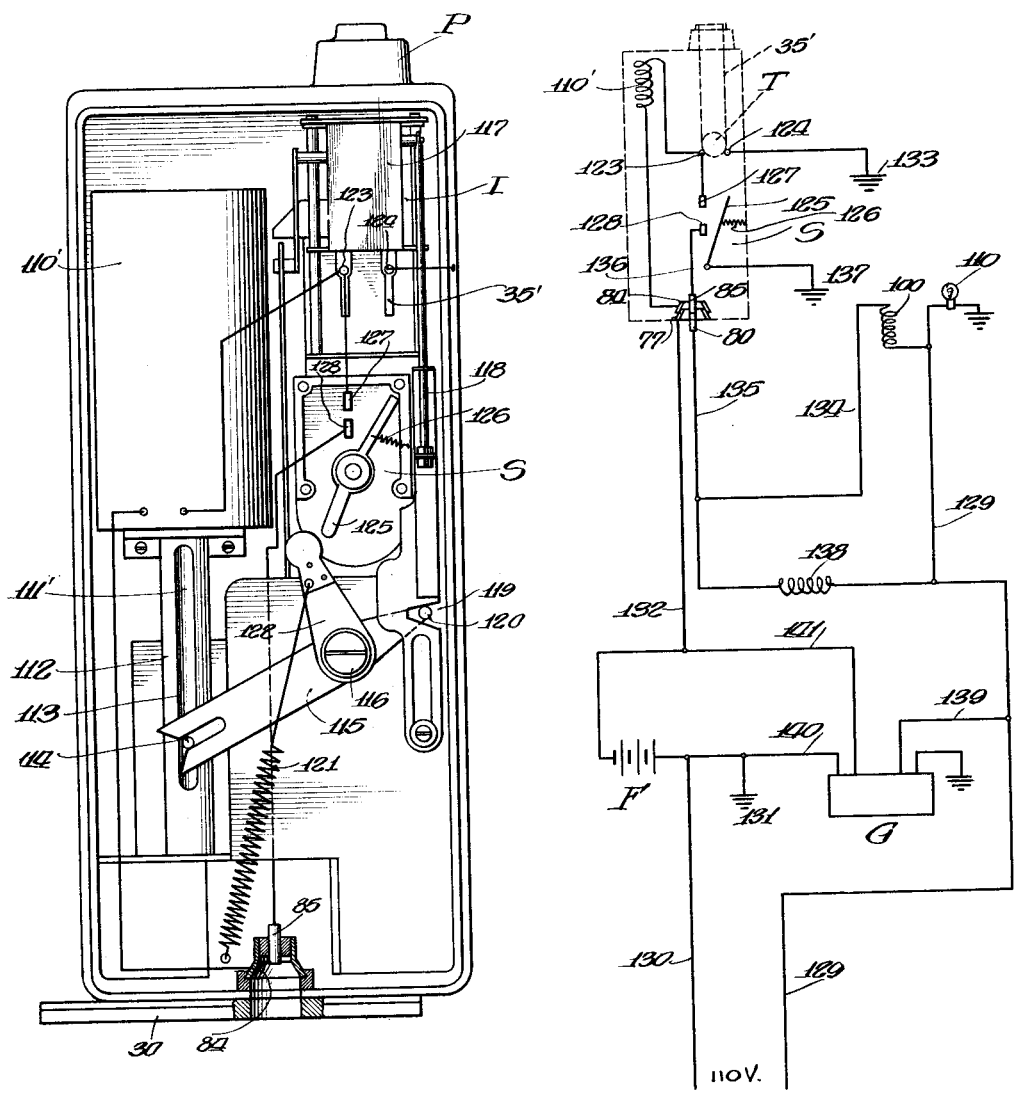

Patented Feb. 14, 1933

1,897,601

UNITED STATES PATENT OFFICE

HUGO J. BAUR, OF CHICAGO, ILLINOIS

ADMISSION TOKEN DEPOSITARY AND ACCOUNTING DEVICE

Application filed October 9, 1930. Serial No. 487,464.

My invention relates to a depositary and accounting device for collecting and accounting tokens representing money values.

My improved device is of particular adaptability and utility in theaters, amusement houses, parks, and other places where admission fees or fares are required, for receiving from the patrons the admission or fare token purchased at the cashier's window, the device being designed for receiving tokens in the form of metallic discs. In theaters, for example, the price of admission may be different for the morning, afternoon and evening performances, and the admission for children may be less than that for adults.

An important object of the invention is to provide an admission token device in which there are depositary units, usually of a number corresponding to the number of different admission price periods during a day, with provision for selectively moving into operative or service position the unit which is to receive the tokens representing the admission fee for the corresponding period. At the cashier's office or at some other place where the tokens are sold, the cashier will have on sale during a certain period only such tokens as represent the admission fees for such period and the depositary unit in service will receive only such tokens and will reject others.

Another object of the invention is to provide a token collecting device of the nature referred to comprising a housing in which a number of depositary units are concealed, together with means for selecting a desired unit for service and for setting it into service position with its token receiving inlet accessible from the outside of the housing.

A further object of the invention is to provide electrical means for the depositary units for selectively cooperating with and shifting received tokens through the units and discharging them therefrom, together with registering or counting devices for each unit for counting the tokens passing therethrough.

A still further object is to provide an individual token receiving receptacle for each unit, which receptacles may be readily removed from the device by authorized persons.

Still another object is to provide for inspection of the tokens by the attendant at the device before the tokens are passed to the receptacles, such inspection means comprising preferably an inspection table into cooperation with which the discharge outlet of a depositary unit is brought when the unit is adjusted into service position.

A further object is to provide means which are automatically operated to tilt the inspection table to discharge a token therefrom into a receptacle when the next token is deposited in the unit in service so that one token will remain in position on the inspection table visible to the attendant until the next token is deposited.

A further object is to adapt each depositary unit for receiving one of a number of interchangeable token entrance slot plugs, with the slots in each plug gauged to receive tokens which will not pass through the slots of the other plugs, and some of the plugs adapted for selectively receiving tokens of different sizes or dimensions.

A further object is to provide means for automatically locking an applied plug against removal from a unit when such unit is adjusted into service position.

The above specifically referred to features and other important features of the invention are incorporated in the structure disclosed on the drawings, in which drawings Figure 1 is a front elevation of the device;

Figure 2 is a rear elevation of the upper part of the device;

Figure 3 is a top view of the device;

Figure 4 is an enlarged section on plane IV—IV of Figure 3, showing one of the depositary units raised into service position;

Figure 5 is a similar sectional view showing the depositary unit in its lower or neutral position;

Figure 6 is a plan view of the device with the cover removed;

Figure 7 is a bottom view of the depositary unitary structure;

Figure 8 is a section on plane VIII—VIII of Figure 6;

Figure 9 is a section on plane IX—IX of Figure 5;

Figure 10 is a section of the upper part of the device on plane X—X of Figure 9;

Figure 11 is a section of the upper part of the device on plane XI—XI of Figure 9;

Figure 12 is an enlarged section on plane XII—XII of Figure 6;

Figure 13 is a section on plane XIII—XIII of Figure 12;

Figure 14 is a section on plane XIV—XIV of Figure 9;

Figure 15 is a vertical diametrical section of the upper end of the unit lifting arm;

Figure 16 is a side elevation of the inspection table mechanism on plane XVI—XVI of Figure 10;

Figure 17 is a side elevation of one of the depositary units with the cover removed; and Figure 18 is a diagrammatic view showing the circuit arrangement.

The various operating and functioning parts of the device are mounted and enclosed within a casing or housing 1 which may be of metal and of rectangular cross section. Transversely extending partitions 2 and 3 divide the housing into an upper chamber or space 4, an intermediate chamber or space 5, and a lower chamber or space 6, a common closure door 7 being provided as a common closure for the chambers 5 and 6. Secured to the top of the housing body is the reinforcing and supporting frame 8 having the internal shoulder 9 for supporting a dome shaped cover 10.

The partition 3 supports and secures a plate 11 having the central hub 12 in which a post 13 rests at its lower end and is rigidly secured by means of a nut 14, the post being preferably tubular and extending at its upper end into a collar 15 formed on the cover 10, the post end having interior threads for receiving the plug 16 provided with a locking head 17 for engaging the cover 10 to lock it securely in closing position.

The depositary or token collecting and accounting mechanism is assembled into a unitary structure insertable in and removable from the chamber 4 of the housing 1. This unitary structure comprises a supporting frame formed by the circular base 18, the top 19, and rods 20 secured to and extending between the base and top. The frame is supported by and rotatable on the top frame 8 of the housing 1 by means of rollers 21 which engage the annular horizontal ledge 22 and which are supported on bearing pins 23 extending from the vertical depending flange 24 on the frame top 19, as clearly shown in Figure 8. The top frame 19 has the lugs 25 on which horizontal rollers 26 are journalled for engaging the inner side of the housing top frame 8 below the ledge 22, and these rollers accurately guide the depositary frame and keep it centrally aligned during rotation thereof. The circular base 18 of the depositary frame engages in the circular opening 27 in the partition 2 and forms a continuation of this partition to separate the chambers 4 and 5. The depositary frame is further aligned and secured by the collars 28 and 29 formed on the top wall 19 and base wall 18 respectively, these collars receiving the post 13. When the housing cover 10 is removed, the depositary frame and parts thereon may be raised out of the chamber 4, and when the frame is to be reinserted it will be accurately guided by its engagement with the post 13.

Mounted within the depositary frame are fare or token receiving boxes or units. There may be any number of such units, three units A, B and C being shown. These units extend vertically and are spaced substantially equidistantly from the axis of the depositary frame and the units are of less height than the distance between the base 18 and top 19 of the depositary frame. Each unit has a supporting base 30 secured thereto which receives the vertical guide pins 31 extending upwardly from the base 18 and assisting in guiding the units for vertical movement. Secured on top of each unit or box by a flange 32 is a cylindrical head 33 having a cylindrical pocket 34, the head at the bottom of the pocket having a slot 35 for the passage of token into the box. Above each unit or box the top wall 19 of the depositary frame has a cylindrical passageway 36 therethrough for receiving the cylindrical head 33, such engagement assisting the pins 31 in aligning and guiding the units for vertical adjustment. The cover 10 has a single passageway 37 therethrough with which any one of the passageways 36 in the top wall 19 may be brought into registration when the depositary structure is rotated, and when in such registration the corresponding depositary box or unit may be raised to project its head 33 upwardly through the passage 37 as shown in Figures 4 and 12.

The pocket 34 in the head 33 of each depositary unit or box is adapted to receive one of a number of interchangeable token selection plugs or adapter members P for adapting the unit for the reception of a fare or admission token of only one size, or for the selective reception of two or more tokens of different size and shape and representative of different monetary values. As best shown in Figures 12 and 13 the plugs comprise each a cylindrical top wall 38 from which depend opposed rectangular frame halves 39 and 40 receiving between them the blocks 41 and 42 whose opposed faces are cut away to provide the desired token passageways. In Figure 13 the blocks are cut to leave the passageway 43 for thin tokens of comparatively large diameter, and the passageway 44 for receiving thicker tokens of less diameter. The walls 39 and 40 are secured at their lower ends to a bottom plate 45 which is of a diameter to fit the diameter of the pocket 34, the upper wall or flange 38 being of larger diameter to seat against the upper edge of the head 33. When a plug is inserted in a pocket 34 its token slots will be in alignment with the slot 35 leading to the respective depositary unit or box. To insure application of a plug in proper alignment, a pin 46 is secured in the bottom wall 45 for entering the guide passageway 47 in the base of the head 33. Correct alignment of the token slots is thus assured.

Provision is also made to automatically lock a plug against removal when a selected depositary unit has been raised into service position with its head and plug projecting through the passage 37 in the cover 10. This means comprises a locking bolt 48 in a thimble 49 secured in the side of the head 33. A spring 50 within the thimble acts against the collar 51 on the bolt and tends to project the conical end of the bolt beyond the outer side of the head wall. The bottom plate 45 of the plug has a clearance passageway 52 therethrough for the thimble so that a plug may be inserted in a pocket 34 past the thimble, and the locking bolt will then be just above the plane of the upper face of the base plate with its inner end outside of the inner edge of the clearance space, as clearly shown in Figures 12 and 13. So long as the depositary units are in their lower position the plug of any of the depositary units may be removed by rotating the depositary structure to bring the unit into registration with the passageway 37 through the cover 10. However, after such alignment of a unit and raising thereof to project its head and plug through the passage 37, the conical end of the locking bolt will encounter the top wall 19 around the passageway 36 therethrough and the bolt will be cammed or shifted inwardly to project its inner end above the base plate 45 of the plug so that the plug will then be locked against removal from the pocket 34. Tampering with the plugs will thus be prevented and a change of plugs can be made only by gaining access to the interior of the housing 1 to actuate mechanism for lowering a unit to its normal or lower position, as will be described more in detail hereafter.

The mechanism for effecting elevation of the depositary units is clearly shown in Figures 4 and 5. The mechanism is within the chamber 5 and accessible only by unlocking the door 7 of the housing 1.

In the base plate 18 and under each of the depositary units is an opening 53 for the passage of the end of a lifter arm 54 extending from the post 13. At its inner end the arm encircles a cam sleeve 55 slidable on the post 13 but secured against rotation thereon. A screw 56 may be provided for securing the arm to the sleeve and for engaging in the slot 57 in the post to prevent rotational movement of the sleeve and arm. A lower cam sleeve 58 encircles the post 13 and rests on the partition wall 11. This sleeve is secured to the post and such securing may be accomplished by a pin 59 extending through the flange 60 on the sleeve and through the post, the flange engaging in a recess in the wall 11. The upper cam sleeve 55 has its lower end formed to present a spirally extending cam surface 61 while the upper end of the lower cam sleeve 58 is formed to present the spirally extending cam surface 62. Between these cam sleeves a wedge sleeve 63 encircles the post and has the upper and lower spirally extending cam surfaces 64 and 65 respectively for cooperating with the cam surfaces 61 and 62. The wedge sleeve 63 is surrounded by a clamping strap 66 which pivots a handle 67 for vertical swing. When this handle is raised into horizontal position the strap 66 and the wedge sleeve 63 may be readily rotated. Normally, as shown in Figure 5, the arm 54 is in its lower position with the lower ends of the respective cam surfaces in engagement. Upon rotation of the wedge sleeve to the position shown in Figure 4, the cam surfaces cooperate to wedge or force the sleeve 55 and consequently the arm 54 upwardly to project the end of the arm through one of the openings 53 and against the under side of the corresponding depositary unit to raise such unit to its upper position with its head 33 projecting through the passage 37 in the cover 10. When the wedge sleeve is rotated in the opposite direction the unit and the arm will be restored by gravity to their normal or lower position.

When the units are in their lower position, as shown in Figure 5, the unit supporting frame may be rotated to bring any desired unit into alignment with the arm 54 and the cover passageway 37. In order to effect accurate registration before the cam mechanism is operated, a latch bar 68 is provided and is operable in the frame 69 secured against the under side of the partition 2 adjacent to the opening 27 into which the base 18 of the depositary structure extends. The base has the depending peripheral flange 70 provided with notches 71 through which the lock bar 68 may project to be received by a locking block 72, these locking blocks being secured against the under side of the base 18 as clearly shown in Figures 7 and 14. A spring 73 tends to push the locking bar 68 inwardly and a handle 74 is provided on the bar. When it is desired to bring another unit into registration with the passageway 37 in the cover 10, the handle 74 is pressed to shift the bar 68 outwardly away from the corresponding block 72 and notch 71 and then the depositary structure may be rotated to bring the desired unit into alignment, and when so aligned the latch bar is released and will project through the corresponding slot 71 in interlocking engagement with the corresponding block 72. Upon release of the bar after shifting thereof out of locking engagement to release the depositary structure, the end of the bar will travel along the outer side of the flange 70 and will then be shifted by the spring inwardly when a notch 70 comes into registration with the bar.

Referring particularly to Figures 4, 5 and 15, the arm 54 is hollow for the passage of electrical conductors to be more specifically referred to hereinafter. In the open end of the arm 54 there is an outer bushing 75 and an inner bushing 76, both of insulating material, which secure between them an outer terminal member 77 to which a terminal clip 78 is secured by nuts 79. At its outer end the terminal member 77 is frustro-conical.

Through the insulating sleeve 76 extends the inner terminal member 80 which is insulated from the outer terminal member by the bushing 76 and an insulating washer 81, a terminal clip 82 being connected to the inner terminal member by nuts 83.

Referring to Figures 4 and 7, there is a terminal member 84 in each of the depositary units which is flared at its lower end to receive the frustro-conical end of the outer terminal member 77 on the arm 54, while an inner terminal member 85 extends through and is insulated from the terminal member 84 and is adapted for contact with the inner terminal member 80 on the arm. When the arm 54 is raised the contacts at its ends electrically engage with the contacts of the engaged unit and an electrical circuit is connected at this point for the supply of current to the operating devices within the unit. When the arm is withdrawn from the unit the circuit will be broken and the unit will be inoperative.

For each depositary unit a token delivery chute 86 is provided, these chutes extending upwardly through openings in the base 18 and being secured to the base, the chutes depending into the chamber 5 to discharge tokens into suitable receptacles. As shown, the lower end of each chute is frustro-conical for receiving the mouth of a token receiving bag 87 which is detachably held in place by a clamping ring 88 as clearly shown in Figures 10 and 11. Within the chamber 4 a token guiding frame or shell 89 is mounted on each chute 86 for directing to the chute the token discharged from the depositary unit. Each unit has a discharge chute 90 extending laterally and downwardly therefrom for receiving tokens deposited in and transmitted through the unit and to conduct the tokens for discharge into the associated guide frame 89 and chute 86 to the receiving receptacle.

Provision is made for inspection of tokens before they are passed to the receiving receptacles. Referring to Figures 9, 10 and 11, at one corner of the housing 1 is secured a supporting frame 91 on whose side wall 92 is hinged an inspection plate or table 93, the hinge shaft 94 supporting the inspection plate being journalled in the lugs 95 on the wall 92 and the plate inclining downwardly towards an inspection opening 96 in the adjacent wall of the housing, which opening is covered by a transparent pane 97.

As best shown in Figure 9 the inner edge of the inspection table is adjacent to the end of the discharge chute 90 coming from the depositary unit which is being used. When the unit is raised to its upper or service position as indicated by dotted lines in Figure 11, the end of the chute 90 will be above the plane of the table so that deposited coins, after transmission through the unit, will roll through the chute and onto the table where they may be inspected through the inspection opening 96. When the table is swung downwardly the token will fall therefrom into an apron 98 and from there through the frame 89 and the delivery chute 86 to the corresponding delivery receptacle 87.

A spring 99 tends to hold the inspection table in its upper token receiving position. Means are provided for automatically swinging the table down to discharge tokens therefrom. Secured to the housing wall above the table is an electromagnet structure 100 having the armature or plunger 101. As shown in Figures 10, 11 and 16, an arm 102 is secured to the under side of the inspection table inwardly of its hinge axis, this arm projecting through an opening 103 in the wall 92 beyond the hinge axis and having its end connected by a link 104 with the plunger 101, the link preferably having a universal or swivel connection 105 with the arm. With this arrangement, when the electromagnet is energized and its plunger is drawn upwardly the inspection table will be swung downwardly. Upon the deenergization of the electromagnet, the spring 99 will restore the inspection table to normal position and the plunger will move down to its normal position. As will be described more in detail hereinafter, the circuit for the electromagnet is closed when a solenoid within the depositary unit is operated to control the transmission of a deposited token through the unit and discharge thereof into the chute 90, the operation of the unit solenoid being initiated when a token is deposited in the unit. A discharged token will fall onto the display table and will remain there until the next token is deposited in the unit and the circuit for the electromagnet 100 is closed to cause the table to be swung down to release the token.

For operating the inspection table manually, independently of the electromagnet 100, a lever 106 is provided for engaging with the plunger 101 or with the link 104, the lever extending from the arm 107 at the inner end of a shaft 108 extending through the adjacent side wall of the housing 1 and terminating in a knurled knob 109. By turning the knob, the lever 106 will be actuated to draw the link 104 upwardly and so cause downward swing of the inspection table.

In order to illuminate the table so that tokens thereon may be more readily inspected, a lamp 110 is provided and projected into the housing above the inspection table from a suitable supporting frame or socket 111. Preferably this lamp is always burning when the device is in service.

The details of construction and arrangement within the depositary units or boxes form no part of this present invention and will be covered in separate applications. In general, the arrangement is similar to that disclosed in Thompson Patent No. 1,699,920 of January 6, 1929, or in the copending application of Ernest H. Thompson, Serial No. 481,913, filed September 15, 1930.

In Figure 17 is shown one of the depositary units in vertical elevation with the rear wall removed, and I have shown more or less diagrammatically the arrangement of the operative parts within the box. At one side of the box is the solenoid 110' whose plunger 111' extends downwardly through a guide tube 112, the guide tube having a slot 113 through which a pin 114 extends from the plunger for engagement in the outer slotted end of a lever 115 pivoted at 116. At the other side of the box is the impeller mechanism designated as a whole I. As disclosed in the patent and co-pending application referred to, such impeller mechanism comprises an impeller carriage 117 adapted to reciprocate vertically. This reciprocation is caused through a link arm 118 having a slot 119 receiving the pin 120 on the inner end of the lever 115 so that when the solenoid plunger is raised the impeller carriage will be shifted downwardly. When the solenoid is deenergized a spring 121 acting on the arm 122 extending from the lever 115 will serve to restore the plunger to its normal position and to restore the impeller carriage to its upper position.

The contact posts 123 and 124 project normally into the impeller structure chute 35' which at its upper end registers with the slot 35 to receive tokens deposited in the plug P associated with the depositary unit, as shown in Figure 12.

A token deposited into the unit will first engage the contact posts 123 and 124 to initially close the circuit through the solenoid 110' and as soon as the solenoid starts its operation a switch structure S is operated to relieve the token of current flow and to control other circuits hereinafter to be described. This switch structure comprises a switch lever 125 pivoted intermediate its ends and normally held in retracted position by a spring 126. When the solenoid plunger is raised the end of the arm 122 engages the lever 125 and swings it into engagement with the contacts 127 and 128.

At the bottom of the box are mounted the inner and outer contact terminals 85 and 84 already hereinbefore referred to, for receiving the contacts at the end of the lifting arm 54.

In Figure 18 I show the circuit arrangement. The circuit includes a storage battery F and a charger G therefor, the battery and charger being preferably accommodated in the chamber 6 of the housing 1. The leads 129 and 130 are adapted for connection with the ordinary electric light circuit by a suitable switch or plug (not shown). The lead 129 connects with one terminal of the lamp 110 which illuminates the inspection table, the other terminal of the lamp being connected with the framework of the structure to which the other lead 130 of the supply circuit is also connected as indicated at 131. A conductor 132 connects with one terminal of the battery and extends through the post 13 and the arm 54 and connects with the outer contact 77 at the end of the arm 54, and when a depositary unit is raised this contact will engage the contact 84 with which the solenoid 110' is connected at one of its terminals, the other terminal of the solenoid being connected to the token contact post 123, the other contact post 124 being connected to the framework as indicated at 133. The other terminal of the battery is connected to the framework at 131, and when a token is deposited it will connect the contact posts 123 and 124 to close the circuit for current flow from the battery through the solenoid winding.

A conductor 134 extends from the supply lead 129 and includes the electromagnet 100 which operates the inspection table, the conductor connecting with the conductor 135 which extends through the post 13 and arm 54 and terminates in the contact 80 at the end of the arm 54 and which, when the depositary unit is raised, engages the contact 85 in the unit, this contact being connected by conductor 136 with the contact 128 of the switch structure S. The other contact 127 of the switch structure is connected with the contact post 123, while the switch arm 125 is connected with the framework at 137. Connected in bridge of the electromagnet 100 is the winding 138 of an electromagnetic device for operating a token counter which may be located at some remote point, as for example, in the office of a theater.

The supply lead 129 supplies current to one side of the battery recharging device G, while the outlet side of the charger is connected by conductors 140 and 141 with the battery so that the battery is kept charged whenever the supply circuit is connected with the supply mains.

When the device is connected to the supply mains the lamp 110 will immediately illuminate and will light up the inspection table. Upon deposit of a token T in the depositary unit, it engages the contact posts 123—124 and closes the battery circuit through the solenoid winding 110' and the solenoid plunger is then raised to shift down the impeller carriage in the manner explained in the patent and co-pending application referred to, and during such movement of the impeller carriage the impeller mechanism therein will co-operate with the token and shift it through the chute 35' of the unit to eventually discharge it into the chute 90 for delivery to the inspection table 93. When the solenoid plunger moves upwardly it causes swing of the switch lever 125 into engagement with the contacts 127 and 128, the coin being then shunted from circuit and relieved from current flow by the circuit which extends from the contact post 123 to contact 127 and the switch lever 125. The engagement of the lever 125 with the contact 128 during initial downward movement of the solenoid plunger closes the circuit from the supply lead 129 through the electromagnet 100, by way of conductors 134 and 135, contacts 80 and 85, and the conductor 136, and the electromagnet actuates its plunger and swings down the inspection table. This, however, happens before the token which originally closed the circuit of the solenoid 110' has been ejected from the depositary unit, so that when the token reaches the inspection table it will remain there until the next token is deposited and then when the electromagnet 100 becomes effective the table will be swung down and the token will drop against the apron 98 and through the frame 89 and chute 86 into the receptacle 87. When the electromagnet 100 is operated the device 138 will also be operated to count the token dropped from the inspection table. At the end of the upward movement of the plunger of the solenoid 110' the switch arm 125 will be relieved from the arm 122 and the spring 126 will restore the switch arm to normal position away from the contacts 127—128 and the solenoid and the electromagnet will be deenergized and the impeller mechanism will be restored to its upper position ready for the reception of another token.

Referring to Figure 6, it will be noted that the plugs P of the depositary units have differently shaped slot formations. The plug for the unit C is shown as having only a single slot so that the plug will selectively receive only a token of a certain diameter and thickness. The plugs for the units A and B each have slot formations for receiving a thin token of larger diameter and a smaller diameter token of greater thickness. The larger diameter token might represent the greater money value, and the smaller, thicker token might represent a lesser money value. The larger token would be sold to adults and the smaller, thicker token to children, it being then impossible for an adult to deposit a smaller lower value token. The depositary unit having the plug P with the single slot may be lifted into operating position for service at a certain time of the day, as for example, during the morning performance at a theater. For the afternoon performance, one of the units A or B may be swung around and raised into functioning position to receive tokens from adults and children, and the tokens for the afternoon would be of monetary values different from those of the tokens for the evening, and the slot formations would be such that the lower value tokens could not be deposited in place of the higher value tokens. The various tokens would be purchased at the box office and then deposited by the patrons in the depositary structure when passing the doorkeeper who will inspect the deposited tokens through the opening 96 in front of the inspection table.

Associated with each depositary unit is a name plate 142 having a designation thereon corresponding to the period during which the unit is to be in service. For example, the designation "morning", "afternoon" and "evening" could appear on the respective plates, and then when the desired unit is raised into operative position the associated name plate will be readable through the opening 143 provided in the housing wall as shown in Figure 2.

As has already been explained, when it is desired to bring another depositary unit into service position, the attendant unlocks the door 7 and then by means of the lever 67 he withdraws the arm 54 so that the unit then in use will move down to its lower or neutral position. Then, after releasing the lock bar 68 from the base 18, the depositary frame with the units thereon may be rotated to bring the desired unit into proper alignment with the passageway 37 in the top 10, and then the lever 67 is swung to cam up the arm 54 to raise the unit into service position and to establish the circuit connections therefor.

In each depositary unit register or token counting mechanism (not shown) is also provided for counting the tokens received by such unit. Where a unit is adapted to receive more than one size token the impeller mechanism I may be designed to control the proper operation of a single register device to be actuated to record the total monetary value of tokens deposited, as disclosed in the Thompson patent referred to, or a separate register device may be provided for counting each size token as disclosed in the Thompson co-pending application referred to. Each depositary unit will thus automatically make its own accounting of tokens received.

As shown on the drawings, each unit has a glazed sight opening 144 in front of the register devices therein and the housing 1 has a door 145 which when open will disclose the register indication on the unit which is in service. When a unit is brought into service position and before it is shifted down out of service the door 145 will be opened and the unit register indications noted. The individual token receiving records of the units can thus be kept and at the end of a period or at the end of a day these records can be totalled and checked with the indication on the recording device 138 located, as for example, in the cashier's office.

When the device is in service, only one of the depositary units is in service position, the other units being concealed and inaccessible within the housing, the various doors of the housing being locked and the housing cover 10 being locked in place by the plug 16 which can be removed only by a special tool. The token receiving plug P of the depositary unit in service is also locked against removal and will receive only tokens of predetermined size and shape. Tampering with the device or fraud is therefore prevented.

It is understood that the impeller mechanism within any of the depositary units is designed to cooperate with the token receiving plugs P to permit registration of only such tokens as are permitted to pass through the plug. If at any time it is desirable to change the units for the accommodation of different size tokens or for a greater number of tokens, these units are readily accessible as the supporting framework with the units thereon may be bodily lifted from the housing after removal of the cover 10. Such removal of the depositary supporting structure will also facilitate repairs or replacements of worn or defective parts.

In order to prevent engagement of the contacts on the arm 54 with any part of the structure before a unit has been properly alined for upward shift into service position, I provide an alining pin 146 extending upwardly from the arm, and in the supporting base 30 of each unit I provide an alining opening 147 (Figures 4, 5, and 7). The pin extends upwardly a distance beyond the arm contacts so that if attempt is made to raise the arm to lift a unit before it has been accurately alined, the pin will encounter the base 30 of the unit and will prevent electrical engagement of the contact 80 with the base, which engagement might cause a short circuit. However, if proper alinement of the unit has been made, the pin will pass through the corresponding opening 147 and then the contacts 84 and 85 or the alined unit will be in proper position above the end of the arm 54 to accurately receive the contacts 77 and 80 on the arm to close the proper circuits for operation of the unit.

The structure shown and described represents a practical embodiment of the various features of my invention, but the invention is not to be understood as being restricted to the details set forth since modifications in construction, arrangement and operation may be made without departing from the scope and spirit of the invention as outlined by the appended claims.

I claim:

1. In a token depositary and accounting device, the combination of a housing, a plurality of depositary units normally enclosed within said housing, and means for selectively bodily moving said units to project their entrance ends to the exterior of said housing for the direct insertion thereinto of tokens.

2. A depositary for collecting tokens comprising a housing, a plurality of depositary units within said housing each having a token receiving entrance, said housing having a single passageway, and means for selectively moving one of said depositary units to project its token entrance through said housing passageway for the direct insertion thereinto of tokens.

3. A token depositary and accounting device comprising a housing, a plurality of depositary and accounting units within said housing, each unit having a token entrance at its upper end, said housing having an opening through its top wall, means for moving said units within said housing to bring a desired unit into position with its entrance in alignment with said housing opening, and means for elevating the selected unit to project its entrance through said housing opening into service position for receiving tokens.

4. A depositary device for tokens comprising a housing having a service opening through one of its walls, a supporting frame within said housing, a plurality of depositary units mounted on said supporting frame, each unit having an extension having a token entrance slot, means for rotating said supporting frame to bring any one of said units into position with its slot extension in registration with said service opening, and means for shifting the selected units to project its slot extension through said service opening to the exterior of said housing for the reception of tokens.

5. A token depositary device comprising a housing having a service opening in its top wall, a supporting frame within said housing, a plurality of depositary units mounted on said frame, means for rotating said frame to bring any desired unit into vertical alignment with said service opening, and means for lifting the selected unit to bring its token entrance into said service opening for the reception of tokens.

6. In a depositary for collecting tokens representing monetary values, the combination of an enclosing housing, said housing having a service opening at its top, lifting mechanism within said housing below said service opening, a supporting frame within said housing between said lifting mechanism and service opening, a plurality of depositary units mounted on said supporting frame, each unit having a token-receiving head, said supporting frame being rotatable to bring any one of said units into position above said lifting mechanism and with its token-receiving head below said service opening, operation of said lifting mechanism raising such positioned unit to project its head through said service opening for the reception of tokens.

7. In a depositary device for collecting tokens representative of monetary values, the combination of an enclosing housing, a plurality of token-receiving and accounting units within said housing, each having a token chute, said housing having a service opening, positioning means for bringing any one of said units into position to align its token chute with said service opening for the reception of tokens, electrically controlled means for operating said units to transmit and account for deposited tokens, and an electrical circuit for said electrical means controlled by the positioning of a selected unit in service position.

8. In a depositary for collecting tokens representing monetary values, the combination of an enclosing housing having a service opening, a plurality of depositary units within said housing having each a token-receiving chute and a token outlet therefrom, means for bringing any one of said units into position within said housing with the entrance of its token chute in registration with said service opening for the reception of tokens, a token receptacle within said housing for each unit, and inspection means mounted on said housing to be located between the token outlet of a unit and the receptacle for such unit when said unit has been moved into service position, said inspection means receiving tokens discharged from the unit.

9. In a depositary for tokens representing monetary values, the combination of an enclosing housing, said housing having a service opening, a plurality of token depositary units within said housing, electrical means within each unit for controlling the transmission of a deposited token and ejection thereof from the unit, said unit being normally out of service position, means for bringing any one of said units into service position relative to said service opening, and means for establishing a controlling circuit for the electrical mechanism within the selected unit when said unit is brought into service position.

10. In a depositary for collecting tokens representing momentary values, the combination of an enclosing housing having a service opening, a plurality of electrically operable depositary units within said housing, means for bringing any one of said units into token receiving service position relative to said service opening, and means for automatically establishing electrical circuit for the selected unit when said unit is brought into service position.

11. A depositary for tokens representing momentary values, comprising an enclosing housing, said housing having a service opening, a supporting frame within said housing, a plurality of depositary units vertically shiftable on said supporting frame, each unit having a token chute entrance, said units being normally in lower neutral position, the unit supporting frame being rotatable to bring any one of said units with its token entrance below and in alignment with said service opening, lifting means for lifting the aligned units to project its token entrance into said service opening for the reception of tokens.

12. A depositary for tokens representing momentary values, comprising an enclosing housing, said housing having a service opening, a supporting frame within said housing, a plurality of depositary units vertically shiftable on said supporting frame, each unit having a token chute entrance, said units being normally in lower neutral position, the unit supporting frame being rotatable to bring any one of said units with its token entrance below and in alignment with said service opening, lifting means for lifting the aligned units to project its token entrance into said service opening for the reception of tokens, electrical operating mechanism for said units, and means for automatically connecting the electrical means of a unit with a supply circuit when said unit is lifted into service position.

13. A depositary device for collecting tokens representing money values, comprising a housing, a plurality of depositary units enclosed within said housing and each having a token chute, each unit having a plug receiving pocket at the upper end of its chute, a detachable plug in said pocket having token passageways formed to determine a predetermined size token to be received by the unit, and means for bringing any one of said units into position with its plug end presented to the exterior of said housing for the reception of tokens.

14. In a depositary for collecting tokens representing money values, the combination of an enclosing casing having a service opening, a plurality of depositary units within said housing having each a head provided with a pocket and a token chute leading from said pocket, a plug in the pocket of each unit having a slot determining the size of token to be received by the respective units, means for bringing any one of said units into position with its head projecting through said service opening for the reception of tokens by the respective plugs, and means becoming effective during positioning of a unit to lock the plug thereof against removal from the unit head.

15. In a depositary for collecting tokens representing monetary values, the combination of an enclosing housing having a service opening, a plurality of depositary units within said housing having each a token receiving chute and a discharge outlet from said chute, means for bringing any one of said units into position within said housing with the entrance of its token chute in registration with said service opening for the reception of tokens, token receptacle means within said housing for receiving discharged tokens, a common inspection means for intercepting tokens on their way to said receptacle means, said inspection means being mounted on said housing for registering with selected units, and means automatically controlled by the passage of a token through the selected unit for releasing intercepted tokens from said inspection means.

16. A depositary for the purpose described comprising a housing having a service opening, a plurality of depositary units within said housing having a token receiving head and a chute extending therefrom and terminating in a discharge outlet, means for bringing any one of said units into service position with its head projecting through said service opening for the reception of tokens, means controlled by the positioning of a selected unit for operating said unit for the transmission of a deposited token therethrough and ejection therefrom, a common inspection means mounted on said housing for intercepting tokens discharged from the selected unit, and means automatically operated by the deposit of a token in the selected unit for operating said inspection means to release therefrom the preceding token discharged from said unit.

17. In a depositary for collecting tokens representing monetary values, the combination of an enclosing housing, a vertical post in said housing, a frame within said housing concentric with said post, a plurality of depositary units supported on said frame, said housing having a service opening at its top, each of said units having a token receiving head and said units being normally in lowered position with their heads below said service opening, said supporting frame being rotatable to bring any one of said units with its head below and in registration with said service opening, and lifting mechanism operable on said post for engaging with a position unit to raise it to project its head through said service opening into position to receive tokens.

18. In a depositary for collecting tokens representing monetary values, the combination of an enclosing housing, a vertical post in said housing, a frame within said housing concentric with said post, a plurality of depositary units supported on said frame, said housing having a service opening at its top, each of said units having a token receiving head and said units being normally in lowered position with their heads below said service opening, said supporting frame being rotatable to bring any one of said units with its head below and in registration with said service opening, and lifting mechanism operable on said post for engaging with a positioned unit to raise it to project its head through said service opening into position to receive tokens, electrical means within each unit set in operation by the deposit of a token therein for controlling the operation of the unit, and a current supply circuit for said operating means in the selected unit automatically connected therewith when said unit is elevated into service position.

19. In a depositary for tokens representing money values, comprising an enclosing housing, a plurality of electrically operated depositary units within said housing, means for bringing any one of said units into service position with its token receiving entrance exposed to the exterior of said housing for the direct insertion of tokens, and means automatically controlled by the setting of a unit into service position for connecting its electrical operating means with a current supply circuit.

In testimony whereof I have hereunto subscribed my name at Chicago, Cook County, Illinois.

HUGO J. BAUR.